United States Patent
Van Dellen, II et al.

(10) Patent No.: US 11,190,639 B2
(45) Date of Patent: Nov. 30, 2021

(54) CALL PROCESSING SYSTEM AND METHOD OF USE

(71) Applicant: Fallback Services, LLC, Grand Rapids, MI (US)

(72) Inventors: Cornelius Van Dellen, II, Grand Rapids, MI (US); Michael J. Klein, Grand Rapids, MI (US)

(73) Assignee: Fallback Services, LLC, Grand Rapids, MI (US)

( * ) Notice: Subject to any disclaimer, the term of this patent is extended or adjusted under 35 U.S.C. 154(b) by 93 days.

(21) Appl. No.: 16/578,436

(22) Filed: Sep. 23, 2019

(65) Prior Publication Data

US 2020/0099787 A1    Mar. 26, 2020

Related U.S. Application Data

(60) Provisional application No. 62/736,257, filed on Sep. 25, 2018.

(51) Int. Cl.
*H04M 3/51* (2006.01)
*H04M 3/493* (2006.01)
*G06F 21/34* (2013.01)

(52) U.S. Cl.
CPC .......... *H04M 3/5166* (2013.01); *G06F 21/34* (2013.01); *H04M 3/4931* (2013.01)

(58) Field of Classification Search
CPC .... H04M 3/5166; H04M 3/4931; G06F 21/34
USPC ....... 704/270.1; 379/142.04, 142.06, 142.09, 379/142.17
See application file for complete search history.

(56) References Cited

U.S. PATENT DOCUMENTS

| | | | | |
|---|---|---|---|---|
| 6,097,800 A * | 8/2000 | McLellan | ............. | H04M 3/382 |
| | | | | 379/114.15 |
| 6,662,023 B1 * | 12/2003 | Helle | ...................... | H04M 1/67 |
| | | | | 455/558 |
| 7,929,544 B2 * | 4/2011 | Kimmitt | ........... | H04M 3/42059 |
| | | | | 370/395.3 |
| 8,180,859 B2 * | 5/2012 | Koch | ...................... | H04L 67/34 |
| | | | | 709/219 |
| 8,291,011 B2 * | 10/2012 | Abu-Hakima | ........ | H04L 67/306 |
| | | | | 709/203 |
| 8,306,202 B2 * | 11/2012 | Citron | ...................... | H04M 1/57 |
| | | | | 379/142.07 |
| 9,609,122 B2 * | 3/2017 | Dave | ................. | H04M 3/42042 |
| 10,474,540 B2 * | 11/2019 | Dunn | .................... | G06F 3/0482 |
| 2001/0026609 A1 * | 10/2001 | Weinstein | ............. | H04M 15/06 |
| | | | | 379/93.01 |

(Continued)

*Primary Examiner* — Binh Kien Tieu
(74) *Attorney, Agent, or Firm* — Price Heneveld LLP

(57) ABSTRACT

A system for accessing information via a voice device comprises a call router configured to initiate and receive calls and at least one application server in communication with the call router via a network. The at least one application server is configured to receive a call from the voice device and access a user account stored in a memory. The application server is further configured to access a plurality of contacts of the user account and receive a contact selection of a selected contact. The application server is further configured to assume an account identification of the user account for one or more communications and control a submission of a message associated with the assumed account identification to a mobile device of the selected contact.

19 Claims, 4 Drawing Sheets

(56) References Cited

U.S. PATENT DOCUMENTS

| | | | |
|---|---|---|---|
| 2005/0047559 A1* | 3/2005 | Colson | H04M 3/493 |
| | | | 379/88.18 |
| 2007/0127656 A1* | 6/2007 | Citron | H04M 1/56 |
| | | | 379/142.01 |
| 2008/0034011 A1* | 2/2008 | Cisler | G06F 11/1469 |
| 2009/0003564 A1* | 1/2009 | Martin | H04M 11/04 |
| | | | 379/102.01 |
| 2011/0047033 A1* | 2/2011 | Mahaffey | H04L 41/0253 |
| | | | 705/14.66 |
| 2011/0078501 A1* | 3/2011 | Koch | H04L 67/34 |
| | | | 714/15 |
| 2018/0196721 A1* | 7/2018 | Dunn | G06F 11/1451 |

* cited by examiner

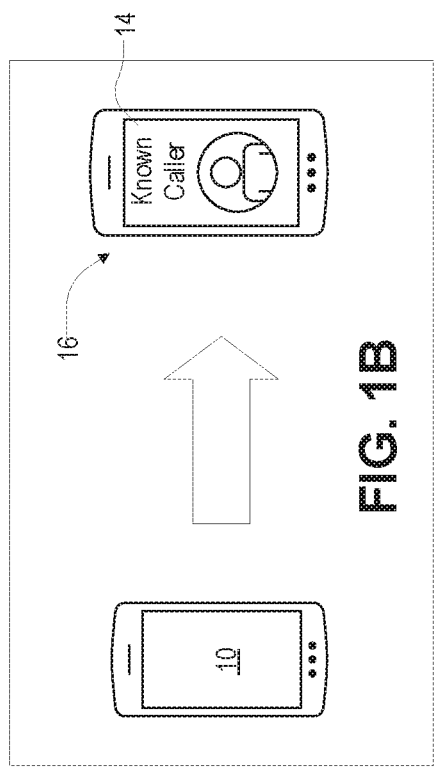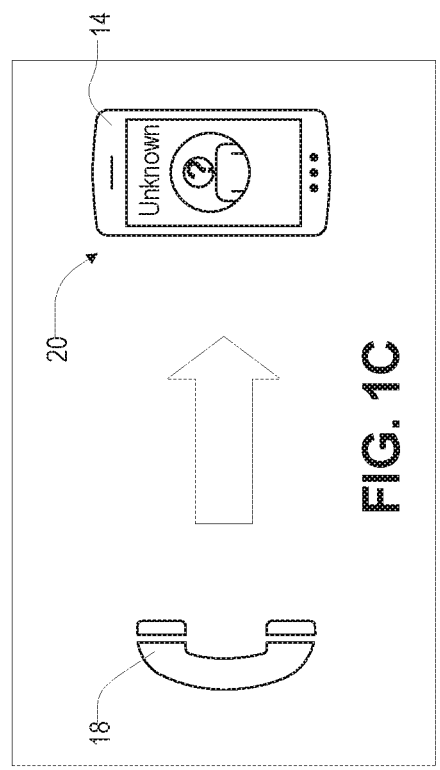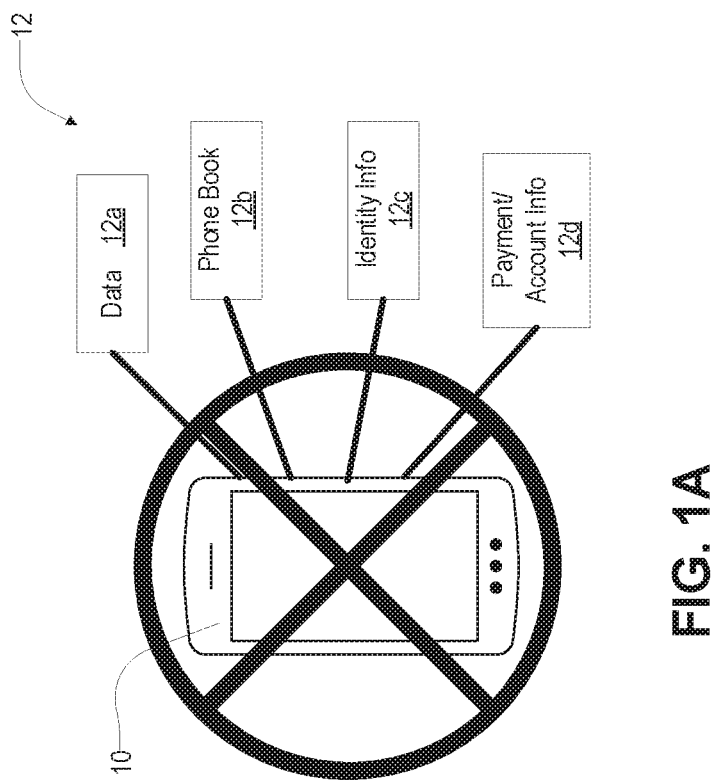

CALL PROCESSING SYSTEM AND METHOD OF USE

CROSS-REFERENCE TO RELATED APPLICATIONS

This application claims priority under 35 U.S.C. § 119(e) and the benefit of U.S. Provisional Application No. 62/736,257 entitled CALL PROCESSING SYSTEM AND METHOD OF USE, filed on Sep. 25, 2018, by Cornelius Van Dellen II, et al., the entire disclosure of which is incorporated herein by reference.

TECHNOLOGICAL FIELD

The disclosure relates to a calling system and, more particularly, to systems and methods configured to access information and process voice calls.

BACKGROUND

Consumers are becoming increasingly dependent on mobile devices, not only to conveniently complete phone calls and access the internet but also to store their personal information. For example, many mobile device users forego committing even some of the most important contact numbers and account information to memory due to the convenience of storing such information on their mobile device. However, as the dependence on the storage of such information increases, users of mobile devices are also more disadvantaged if the mobile device is lost, stolen, and/or broken. Accordingly, the disclosure provides for systems and methods that may be used to assist users of mobile devices in retrieving important contact information.

SUMMARY

In at least one aspect, a system for accessing information via a voice device is disclosed. The system comprises a call router configured to initiate and receive calls and at least one application server in communication with the call router via a network. The at least one application server is configured to receive a call from the voice device and access a user account stored in a memory. The application server is further configured to access a plurality of contacts of the user account and receive a contact selection of a selected contact. The application server is further configured to assume an account identification of the user account for one or more communications and control a submission of a message associated with the assumed account identification to a mobile device of the selected contact.

Aspects of the disclosure may comprise one or more of the following features and/or operations:
the at least one application server is further configured to prompt a caller for an account identification; and access the user account stored in the memory indicated by the account identification;
the at least one application server is further configured to prompt a caller for an account password for the user account; and access the user account in response to the password matching a stored password for the user account stored in the memory;
the at least one application server is further configured to delay for a predetermined period of time following the submission of a message associated with the assumed account identification, and following the predetermined period, initiate a voice call from with the assumed account identification to the selected contact;
the at least one application server is further configured to announce a plurality of communication options for each of the contacts to a caller; and receive a communication selection identifying a selected communication option.
the communication options comprise a selection of a voice call to the selected contact, a custom message to the selected contact, and at least one previously stored message configured to automated submission to the selected contact;
the previously stored message comprises at least one of a previously recorded voice message and a preconfigured text message comprising text previously saved in the memory;
the assumed account identification is configured to emulate the account identification identified via the user account;
the at least one application server is further configured to initiate the submission of the message associated with the assumed account by communicating caller identification information associated with the assumed account;
the assumed account information identified by the account identification is associated with a mobile communication device; and/or
the voice device is a public switched telephone network-connected device or an internet addressable device.

In another aspect, a method for accessing information via a voice device is disclosed. The method comprises receiving a call from the voice device, prompting a caller for an account identification, and receiving an account identification of user account. The method further comprises accessing the user account stored in a memory indicated by the account identification, accessing a plurality of contacts of the user account, and receiving a contact selection of a selected contact. The method further comprises announcing a plurality of communication options based on the contacts to the caller, receiving a communication selection based on the communication options and assuming the account identification of user account for one or more communications. The method further comprises controlling a submission of a message associated with the account identification to a mobile device of the selected contact.

Aspects of the disclosure may comprise one or more of the following features and/or operations:
prompting the caller for an account password for the user account; and accessing the user account in response to the password matching a stored password for the user account stored in the memory;
delaying for a predetermined period of time following the submission of a message associated with the assumed account identification, and following the predetermined period, initiating a voice call from with the assumed account identification to the selected contact;
the communication options comprise a selection of a voice call to the selected contact, a custom message to the selected contact, and at least one previously stored message configured for automated submission to the selected contact; and/or
the assuming of the user account comprises communicating caller identification information associated with the assumed account.

In yet another aspect, a system for accessing information via a voice device is disclosed. The system comprises a first voice communication device, a second voice communication device, and a call router configured to initiate and receive calls from each of the first voice communication device and the second voice communication device. The system further comprises at least one application server in communication with the call router via a network. The at least one application server is configured to receive a call from the first voice communication device, prompt a caller for an account identification, and access a user account stored in a memory indicated by the account identification. The at least one application server is further configured to access a plurality of contacts of the user account, receive a contact selection of a selected contact, and assume an account identification of the user account for one or more communications. The account information corresponds to the identity of a mobile device. The application server is further configured to control a submission of a communication associated with the assumed account identification of the user account to the second voice communication device.

Aspects of the disclosure may comprise one or more of the following features and/or operations:
the mobile device different from the first voice communication device and the second voice communication device;
the communication associated with the assumed account identification comprises at least one of a selection of a voice call to the selected contact, a custom message to the selected contact, and at least one previously stored message configured to automated submission to the selected contact; and/or
the assumed account identification is configured to emulate the account identification identified via the user account.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 1A is an illustrative diagram of a mobile device demonstrating personal information commonly stored thereon;

FIG. 1B is a diagram demonstrating a call received by a mobile device from a known caller;

FIG. 1C is a diagram demonstrating a call received by a mobile device from an unknown caller;

DETAILED DESCRIPTION OF EMBODIMENTS

Figure 2:
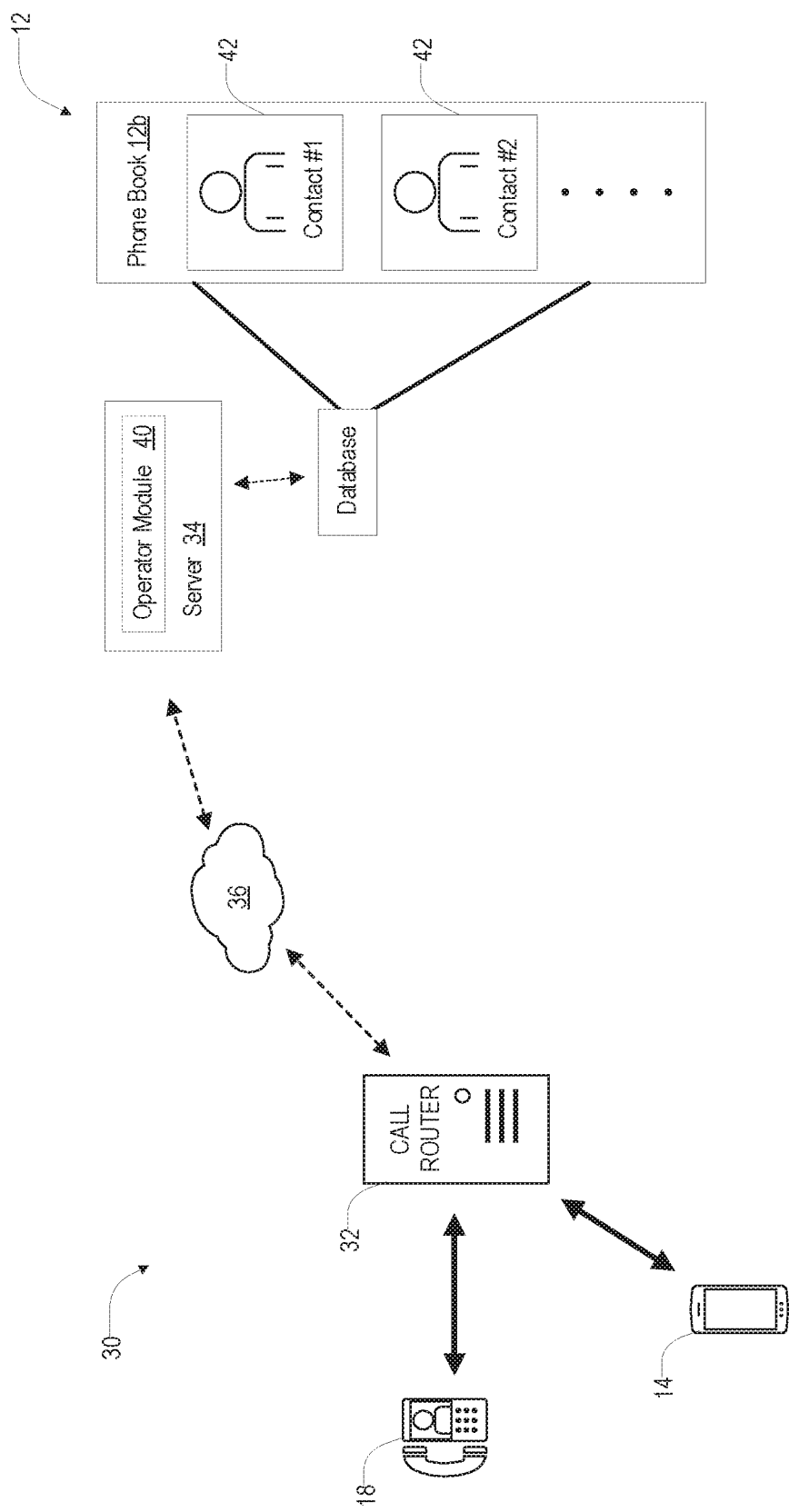
FIG. 2 is a block diagram of a system configured to access information via a voice device.

For purposes of description herein, it is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring generally to FIGS. 1A, 1B, 1C, a scenario related to the loss or destruction of a personal mobile device 10 is shown. As demonstrated in FIG. 1A, the personal mobile device 10 is shown crossed out signifying its loss or destruction. In such circumstances, a user of the personal mobile device 10 may lose access to various personal information 12. For example, the personal information 12 may include, but not be limited to, data 12a, phone book 12b, identity information 12c, and/or payment/account information 12d. Without access to their personal information 12, a user of the personal mobile device 10 may be lost or vulnerable if they are unable to recall the personal information 12 necessary to recover from a situation related to the loss or destruction of the personal mobile device 10. The disclosure provides for systems and methods that may be implemented to assist the user in recovering from such a situation.

Another consideration related to the loss of a personal mobile device 10 is the loss of identifying information (e.g. caller ID) that is typically communicated from the personal mobile device 10. In typical circumstances, as demonstrated in FIG. 1B, a call originated from a personal mobile device 10 to a contact device 14 will identify the incoming call as originating from a known caller 16. However, as demonstrated in FIG. 1C, a call originating from an unknown device that is received by the contact device 14 may indicate that the incoming call has originated from an unknown caller 20. Under such circumstances, an individual or contact of the user that receives a call from a voice device 18 associated with an unknown caller 20 may be unlikely to answer the call due to the unknown origin. In order to avoid such situations, the systems and methods discussed herein may provide for a convenient method for a user of the personal mobile device 10 to contact the contact device 14 from a generic voice device 18, which assumes the call identification information (e.g. a personal telephone number) typically associated with the personal mobile device 10. As discussed herein, the contact device 14 may correspond to a device that is owned or operated by a contact of the user of the personal mobile device 10 that has the caller identification of the user stored therein.

Though the personal mobile device 10 and the contact device 14 are referred to as specific devices, these devices may generally correspond to voice devices, which may be similarly configured to the voice device 18. The personal mobile device 10 and the contact device 14 are not labeled in the drawings as voice devices for clarity in order to easily distinguish among the devices discussed herein. In general, the voice device 18 may correspond to a variety of electronic devices, such as landline telephones, cellular telephones, satellite telephones, voice-over-internet-protocol (VOIP) telephones, session initiation protocol (SIP) devices, Skype or Gtalk connected devices, etc. In the context of the scenarios described herein, the personal mobile device 10 may correspond to a portable device that may be more susceptible to loss, theft, or damage than conventional landline or permanently tethered telephones.

Referring now to FIG. 2, a block diagram of a system 30 configured to assist a user in recovering the personal information 12 is shown. In various embodiments, the system 30 may comprise a call router 32 in communication with a server 34 or application server via a communication network 36. The communication network 36 may correspond to the internet or various networks and databases communicatively connected therewith. In operation, the system 30 may be configured to receive a call from the voice device 18 via the call router 32 and connect a caller to an automated operator or operator module 40 operating as software on the server 34. As further provided in the following detailed description, the system 30 may be accessed via the voice device 18 to access the personal information 12 and recover from the loss or destruction of the personal mobile device 10.

As a situational example, the system 30 may be configured to assist the user of the personal mobile device 10 in communicating with one or more contacts 42 stored or accessible by the server 34. In operation, the system 30 may be configured to receive a call via the call router 32 and connect the caller (e.g. the user of the mobile device 10 that is broken or lost) with the operator module 40. The operator module 40 may provide a greeting and prompt the caller using the voice device 18 to enter or otherwise provide an account number associated the personal mobile device 10 (e.g. a personal telephone number). In response to receiving the account number, the operator module 40 may access the account associated with the account number and also may prompt the user for a password.

Upon successfully accessing the account associated with the account number of the user, the server 34 may access one or more contacts 42 associated with the account previously stored in a memory. The operator module 40 may announce a menu listing each of the contacts 42 to the user via the call router 32 and the voice device 18. Additionally, the operator module 40 may prompt the user of the voice device 18 to identify a selected contact of the contacts 42 for communication. Upon receiving a selection of one of the contacts 42, the server 34 may initiate a voice call with the contact device 14 associated with the selected contact.

In some embodiments, the system 30 may further be configured to allow the user of the voice device 18 to assume the caller identification information associated with the personal mobile device 10 (e.g. the device that is lost or stolen). Accordingly, upon initiating the call to the contact device 14, the system 30 may supply caller identification to the call router 32 such that the call to the contact device 14 appears to originate from the personal mobile device 10. Additionally, the system 30 may be operable to send one or more predesignated messages to the contact device 14 from the account number associated with the personal mobile device 10. For example, the system 30 may be configured to send a text message (e.g. SMS message, MMS message, etc.) to the contact device 14 alerting the user of the contact device 14 that a call is to be expected from the user of the personal mobile device 10. Accordingly, the system 30 not only provides for a convenient method of recovering personal information but may also provide for a way to place a user of the system 30 in communication with a selected contact while assuming the caller identification information associated with the personal mobile device 10.

As discussed herein, each of the voice devices 18, including the personal mobile device 10 and the contact device 14, as well as additional generic voice devices, may correspond to devices connected via a public switched telephone network (PSTN) or intranet addressable communication devices. Such devices may include but are not limited to, landline telephones, cellular telephones, satellite telephones, voice-over-internet-protocol (VOIP) telephones, SIP devices, Skype or Gtalk connected devices, etc. Some of these devices may be operable to communicate via one or more messaging services in addition to being operable to communicate via conventional voice protocols. For example, some of the voice devices 18 discussed herein may be operable to communicate via short message services (SMS) or multimedia message services (MMS). The call router 32 may access the operator module 40 or various applications on the server 34 by mapping a call received from the voice device 18 to the application (e.g. operator module 40). For example, the call router 32 may map calls to the server 34 or any internet-connected address via a universal resource identifier (URI). Accordingly, the system 30 may be operable to access information from a variety of servers and direct calls received by the call router 32 to various applications or modules to achieve the methods described herein. In this way, the disclosure provides for a flexible system that may be implemented in a variety of ways to assist the user of the personal mobile device 10 in recovering from the loss or damage of the mobile device 10.

As discussed herein, the application server 34 may be implemented as a computerized processing system comprising a processor, memory, and one or more input and/or output (I/O) devices (or peripherals) that are communicatively coupled to the call router 32. The server 34 may comprise various controllers, buffers (caches), drivers, repeaters, and receivers, to enable communications. Further, the server 34 may include address, control, and/or data connections to enable appropriate communications among the other computer components.

As discussed herein, the processor may be an application-specific or commercially available processor, a central processing unit (CPU), an auxiliary processor among several processors associated with the server 34, a semiconductor-based microprocessor (in the form of a microchip or chipset), or generally any device for executing software instructions. The memory may include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory may incorporate electronic, magnetic, optical, and/or other types of storage media. The memory may have a distributed architecture where various components are situated remote from one another but can be accessed by the processor. In operation, the server 34 may be configured to execute software stored within the memory in order to achieve the various processes discussed herein.

Figure 3:
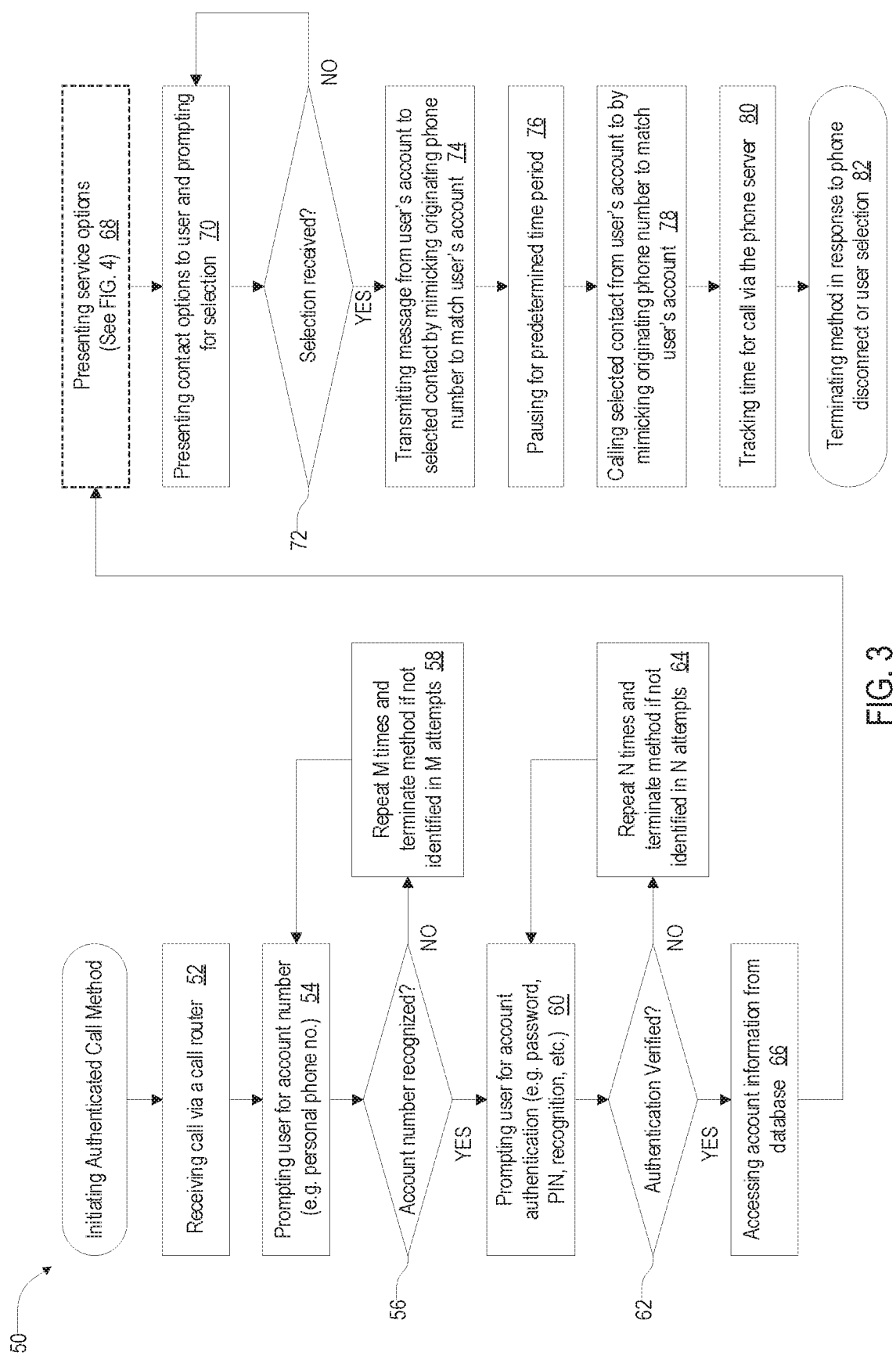
FIG. 3 is a flowchart demonstrating a method of retrieving contact information and initiating a telephonic communication with a contact mimicking an originating telephone number from a personal device.

Referring now to FIG. 3, a flowchart of a method 50 for initiating a voice communication with a selected contact of the contacts 42 are discussed in further detail. The method 50 may begin in step 52 by receiving a call via the call router 32. Upon receiving the call, the method 50 may continue by prompting a user or caller for an account number (e.g. a personal telephone number) (54). The operator module 40 may verify the account number as a preconfigured account stored in memory accessible via the server 34 in step 56. If the account number is not recognized, the method 50 may provide for the user to repeat entering the account number M times and terminate the method 50 or call if the account number is not identified within a predetermined number of attempts (58). The number of attempts (e.g. M) may correspond to a predetermined number programmed in memory.

If the account number is identified, the system 30 may prompt the user or caller for an account authentication (e.g. a password, pin, voice recognition, etc.) (60). In step 62, the system 30 may verify the authentication by comparing an input from the caller to a stored authentication code. If the authentication is not verified in step 62, the system 30 may repeat the authentication step n times and terminate the method 50 or call if the authentication is not verified within a predetermined number (n) attempts (64). Upon successful verification of the authentication in step 62, the method 50 may proceed by accessing account information associated with the account number from one or more databases accessed via the server 34 (66).

Figure 4:
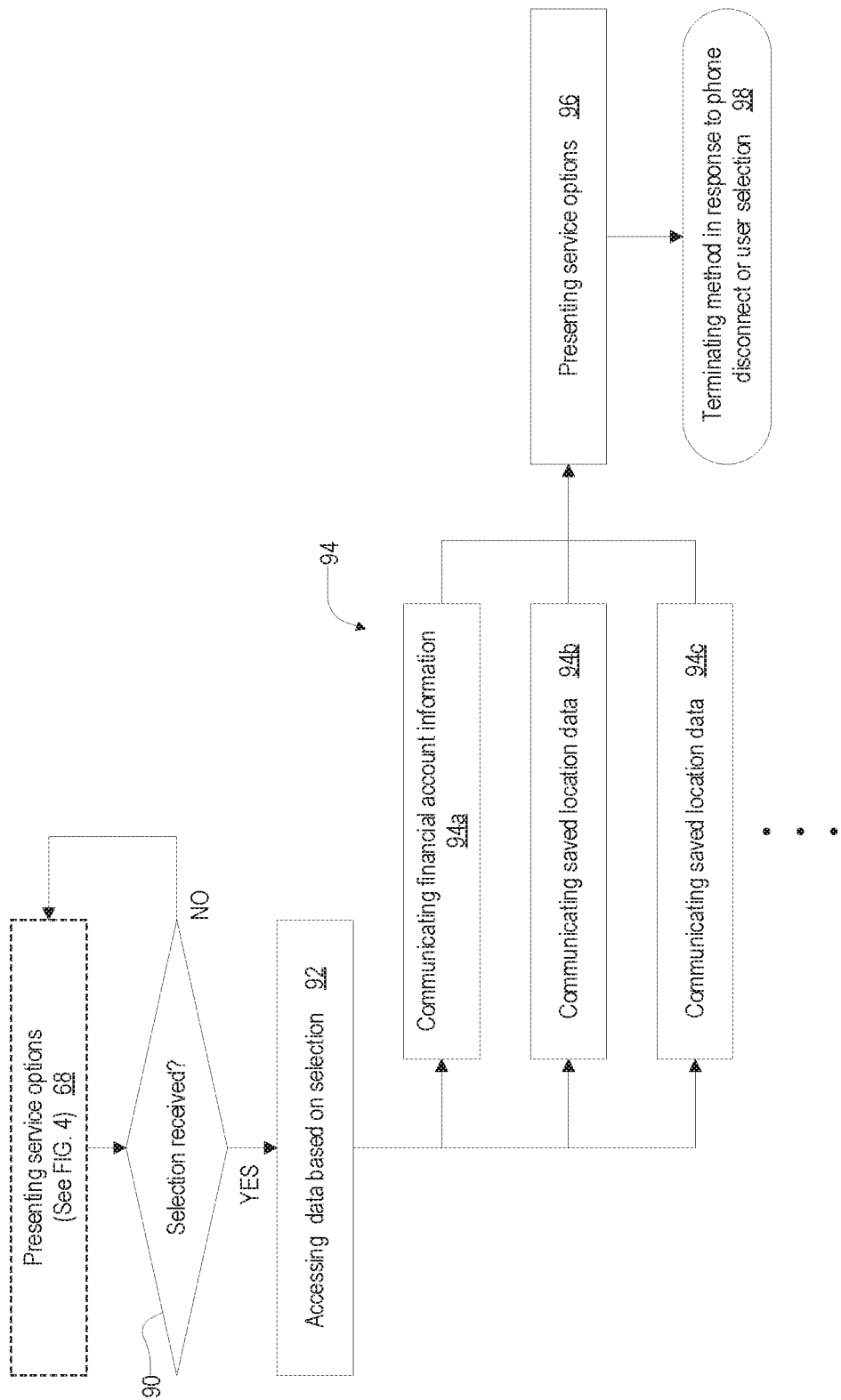
FIG. 4 is a flowchart continued from FIG. 3 demonstrating additional service options accessible via a method.

Upon accessing the account associated with the account number, the method 50 may provide for the presentation of various service options as further discussed in FIG. 4 (68). Continuing to step 70, one of the service options that may be presented or announced to the caller via the operator module 40 is the presentation of contact options which may be audibly announced to the user or caller. Following the contact options, the method 50 may prompt the user for a selection identifying a selected contact (70). If a selection is not received in step 72, the method 50 may return to step 70. If a selection of a contact is received in step 72, the method 50 may continue to step 74. In step 74, the method 50 may transmit a pre-configured message from the user's account to the selected contact by emulating or mimicking the caller identification or originating telephone number to match the user's account. In this way, the message received by the selected contact may appear to have originated from the personal mobile device 10 associated with the account number (e.g. personal telephone number). Following the transmission of the message, the method 50 may pause for a predetermined time period to allow the selected contact to receive the message via the contact device 14 (76).

Following the predetermined time period, the method 50 may continue by calling the selected contact from the user's account by mimicking the originating telephone to match that associated with the user's account (78). For example, a call to the selected contact may be initiated with caller identification information associated with the user account of the personal mobile device 10. If the call is answered by the selected contact, the method 50 may continue by tracking the time for the call, which may be utilized to assess charges for the call (80). Upon conclusion of the call between the voice device 18 (generic voice device) and the contact device 14, the method 50 may be concluded (82).

Referring now to FIG. 4, as discussed previously in step 68 of the method 50, additional service options may be presented to the caller. For example, the operator module 40 may announce additional service options, including, but not limited to, communicating financial information (e.g. bank account numbers, credit card numbers, etc.), saved location or address data, and/or saved personal identification data (e.g. driver's license numbers, social security numbers, passport numbers, etc.). Following the announcement of the various service options available, the method 50 may continue to step 90 to identify whether a valid selection of a service option is received from the voice device 18 (90). If a valid selection is not received, the method 50 may continue by presenting the service options again for selection. If a valid selection is identified in step 90, the method 50 may access the data associated with the selection (92). Once the data is accessed, the method 50 may continue by communicating the data associated with the selection to the caller (94). For example, the operator module 40 may announce or communicate financial account information 94*a*, the saved location data 94*b*, and/or the saved personal data 94*c*.

Following the announcement of the data associated with the selection, the method 50 may return to presenting the service options in step 96. The method 50 may be terminated at any time during the call in response to the voice device 18 being disconnected or an inappropriate user selection, which may result in disconnection of the call (98). Accordingly, the various systems and methods discussed herein may be highly beneficial in assisting a user of a personal mobile device 10 in recovering from loss or destruction of a device 10. Though specific steps and methods of operations are described herein, it shall be understood that the system 30 and associated devices and methods may be used in various combinations without departing from the spirit of the disclosure.

Various aspects of the system 30 may be implemented in software or programming that may be stored in a non-transient computer-readable medium for use by or in connection with any computer-related system or method. In the context of this document, a "computer-readable medium" can be any means that can store, communicate, propagate, or transport the program for use by or in connection with the instruction execution system, apparatus, or device. The computer-readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Accordingly, various aspects of the system 30 may be embodied in a computer-readable medium for use by or in connection with an instruction execution system, apparatus, or device, such as a computer-based system, processor-containing system, or other system that can fetch the instructions from the instruction execution system, apparatus, or device and execute the instructions.

It will be understood by one having ordinary skill in the art that construction of the described device and other components is not limited to any specific material. Other exemplary embodiments of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A system for accessing information via a voice device and processing a communication from a user account of a first mobile device different from the voice device, the system comprising:
   a call router configured to initiate and receive calls;
   at least one application server in communication with the call router via a network, wherein the at least one application server is configured to:
   receive a call from the voice device;
   access the user account stored in a memory;
   access a plurality of contacts of the user account;
   receive a contact selection of a selected contact;
   assume account information of the user account of the first mobile device for the communication; and
   control a submission of the communication as a message associated with the assumed account information to a second mobile device of the selected contact, wherein the assumed account information emulates an account identification of the user account of the first mobile device.

2. The system according to claim 1, wherein the at least one application server is further configured to:
   prompt a caller for the account identification; and
   access the user account stored in the memory indicated by the account identification.

3. The system according to claim 2, wherein the at least one application server is further configured to:
   prompt a caller for an account password for the user account; and
   access the user account in response to the password matching a stored password for the user account stored in the memory.

4. The system according to claim 2, wherein the at least one application server is further configured to:
   delay for a predetermined period of time following the submission of a message associated with the assumed account information, and following the predetermined period, initiate a voice call with the assumed account information to the selected contact.

5. The system according to claim 2, wherein the at least one application server is further configured to:
   announce a plurality of communication options for each of the contacts to the caller; and receive a communication selection identifying a selected communication option.

6. The system according to claim 5, wherein the communication options comprise a selection of a voice call to the selected contact, a custom message to the selected contact, and at least one previously stored message configured to automated submission to the selected contact.

7. The system according to claim 6, wherein the previously stored message comprises at least one of a previously recorded voice message and a preconfigured text message comprising text previously saved in the memory.

8. The system according to claim 1, wherein the at least one application server is further configured to:
   initiate the submission of the message associated with the assumed account information by communicating caller identification information with the message as the assumed account information.

9. The system according to claim 1, wherein the assumed account information identified by the account identification is caller identification information for the first mobile device associated with the account identification.

10. The system according to claim 1, wherein the voice device is a public switched telephone network-connected device or an internet addressable device.

11. The system according to claim 1, wherein the submission of the message with the assumed account information causes the submission to appear upon receipt by the second mobile device to originate from the user account of the first mobile device.

12. A method for accessing information via a voice device and processing a communication from a user account of a first mobile device different from the voice device, the method comprising:
    receiving a call from the voice device;
    prompting a caller for an account identification;
    receiving an account identification of the user account;
    accessing the user account stored in a memory indicated by the account identification;
    accessing a plurality of contacts of the user account;
    receiving a contact selection of a selected contact;
    announcing a plurality of communication options based on the contacts to the caller;
    receiving a communication selection based on the communication options;
    assuming account information of the user account of the first mobile device for the communications, wherein the assuming of the account information comprises communicating a caller identification information as the account information with a message; and
    controlling a submission of the message emulating the account information of the first mobile device to a second mobile device of the selected contact.

13. The method according to claim 12, further comprising:
    prompting the caller for an account password for the user account; and accessing the user account in response to the password matching a stored password for the user account stored in the memory.

14. The method according to claim 12, further comprising:
   delaying for a predetermined period of time following the submission of a message associated with the assumed account information, and following the predetermined period, initiating a voice call with the assumed account information to the selected contact.

15. The method according to claim 12, wherein the communication options comprise a selection of a voice call to the selected contact, a custom message to the selected contact, and at least one previously stored message configured for automated submission to the selected contact.

16. A system for accessing information via a first voice communication device and processing a communication from a user account of a mobile device, the system comprising:
   a call router configured to initiate and receive calls from each of the first voice communication device and a second voice communication device;
   at least one application server in communication with the call router via a network, wherein the at least one application server is configured to:
      receive a call from the first voice communication device;
      prompt a caller for an account identification;
      access the user account of the mobile device stored in a memory indicated by the account identification;
      access a plurality of contacts of the user account;
      receive a contact selection of a selected contact;
      assume account information comprising caller identification information of the user account of the mobile device for the communications, wherein the account information corresponds to the caller identification information of the user account of the mobile device and the communication emulates the caller identification information of the user account; and
      control a submission of a communication associated with the assumed account information of the user account to the second voice communication device.

17. The system according to claim 16, wherein the mobile device is different from the first voice communication device and the second voice communication device.

18. The system according to claim 16, wherein the communication associated with the assumed account information comprises at least one of a voice call to the selected contact, a custom message to the selected contact, and at least one previously stored message automatically submitted to the selected contact.

19. The system according to claim 16, wherein the submission of the communication with the assumed account information causes the submission to appear upon receipt by the second voice communication device to originate from the user account.

\* \* \* \* \*